JOHN C. HEARNE.

Improvement in Railroad Hand-Cars.

No. 115,609.                  Patented June 6, 1871.

UNITED STATES PATENT OFFICE.

JOHN C. HEARNE, OF PLEASANT HILL, MISSOURI, ASSIGNOR TO HIMSELF AND GEORGE W. DEITZLER, OF LAWRENCE, KANSAS.

IMPROVEMENT IN RAILROAD HAND-CARS.

Specification forming part of Letters Patent No. 115,609, dated June 6, 1871.

*To all whom it may concern:*

Be it known that I, JOHN C. HEARNE, of Pleasant Hill, in the county of Cass and State of Missouri, have made certain new and useful Improvements in Hand-Cars for railroad and similar purposes; and I do hereby declare that the following is a full and true description thereof, reference being had to the accompanying drawing and to the letters of reference marked thereon.

This invention relates to an improved construction of hand cars or trucks for railroad, mining, bridging, and similar purposes; and the nature thereof consists in the combination of gearing, spring, and lever devices, arranged on separate shafts, by which a continuous propelling power is achieved to drive the wheels of the car, all of which will now more fully be described.

To enable those skilled in the art to make and use my said invention, I will now more fully describe the same, referring to the accompanying—

Figure 1:
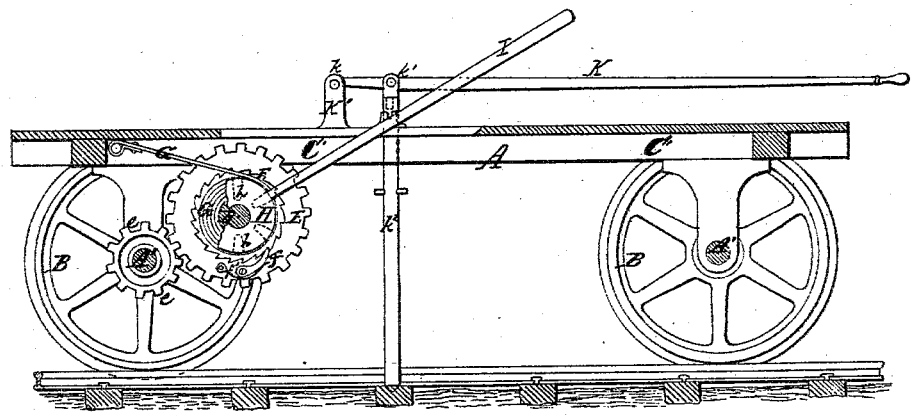
Figure 2:
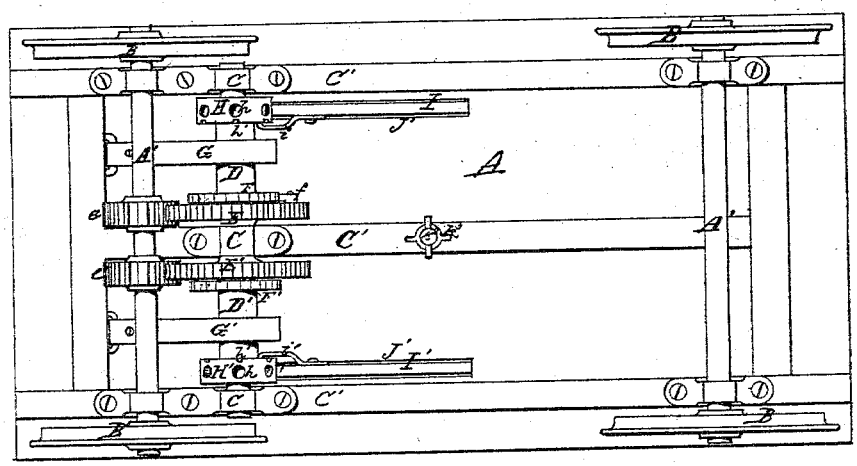

Figure 1 as a sectional elevation; to Fig. 2 as a bottom plan.

The car A has wheels B on axles B', as usual. Supported in proper journals C secured to the floor-beams C' are stout shafts D D', carrying the propelling mechanism, as follows: On said shafts, respectively, I arrange loosely the large spur-gears E E', Fig. 2, to mesh with pinions $e$ $e'$ secured to axle A', Fig. 1. Alongside said gears E E', secured to shafts D D', are the respective ratchet-wheels F F'. In each of said ratchets a pawl, $f$, engages, being pressed down by springs $f'$, the springs and pawls being secured to each spur-gear E E'. Also, on each of the bearing-shafts D D' the springs G G' coil, one end of said springs attaching thereto, while the other end attaches to the transverse beam of the car. To wind the springs G G' I have furthermore arranged on both shafts D D' the respective hubs H H' having a series of holes, $h$, and mortises $h'$ on side. In said hubs the hand-levers I I' are fitted to engage, being secured in position by a spring, $i$ $i'$, engaging in the mortises $h'$, Fig. 2. The floor of the car has slots J J', to allow for the play of the hand-levers I I'.

The operation of said mechanism to propel the wheels of the car is, therefore, as follows: The operator, lifting hand-lever I, winds spring G, the pawl $f$ engaging in ratchet F as soon as said spring unwinds. At the same time as the spring unwinds its tension forms the motor to drive the large gear E, which, in its turn, operates pinion $e$ on axle A' that drives the wheels. The operation of parts on shaft D' is the same; therefore the operator by alternately actuating the hand-levers one spring coils while the other recoils, and this continuous propelling motion achieved is imparted to the wheels.

From the construction of the propelling mechanism it will be observed that the power can be increased by a tighter coiling of the springs G G'; also, that if the expanding tension of said springs is not sufficient as a motor the operator can supply the power by lifting the hand-lever; otherwise, the operation of parts is effected with great ease, safety, and dispatch.

Having thus fully described my said invention, what I claim is—

The independent shafts D D', in combination with levers I I', hubs H H', springs G G', ratchet-wheels F F', spring pawls $f$ $f'$, spur-wheels E E', and pinions $e$ $e'$, substantially as and for the purpose set forth.

In testimony of said invention I have hereunto set my hand in presence of witnesses.

J. C. HEARNE.

Witnesses:
WILLIAM W. HERTHEL,
ROBERT BURNS.